United States Patent
Faver et al.

(10) Patent No.: US 9,697,742 B2
(45) Date of Patent: *Jul. 4, 2017

(54) SYSTEM FOR CONSTRUCTING MAZES

(71) Applicants: William Lloyd Faver, Fort Worth, TX (US); Glenn D. Larson, Keller, TX (US)

(72) Inventors: William Lloyd Faver, Fort Worth, TX (US); Glenn D. Larson, Keller, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/007,394

(22) Filed: Jan. 27, 2016

(65) Prior Publication Data

US 2016/0225279 A1    Aug. 4, 2016

Related U.S. Application Data

(63) Continuation-in-part of application No. 14/325,399, filed on Jul. 8, 2014, now Pat. No. 9,302,198.

(51) Int. Cl.
| | | |
|---|---|---|
| *A63J 11/00* | (2006.01) | |
| *G09B 19/00* | (2006.01) | |
| *A47B 96/14* | (2006.01) | |
| *E04H 17/00* | (2006.01) | |

(52) U.S. Cl.
CPC .......... *G09B 19/00* (2013.01); *A47B 96/1425* (2013.01); *A63J 11/00* (2013.01)

(58) Field of Classification Search
CPC ..... A63J 11/00; G09G 15/00; G09G 15/0056; G09G 15/0068; E04B 2/74; E04B 2/7405; E04B 2/76; A47G 5/00; A47G 29/122; A47G 29/1216

USPC .............................. 472/59, 62, 136; 160/135

See application file for complete search history.

(56) References Cited

U.S. PATENT DOCUMENTS

| | | | | | |
|---|---|---|---|---|---|
| 2,855,037 | A | * | 10/1958 | Stiffel | F16B 12/02 15/268 |
| 3,596,701 | A | * | 8/1971 | Cowan | G09F 15/0068 160/135 |
| 5,319,905 | A | * | 6/1994 | Szirtes | B64G 1/443 136/245 |
| 5,364,311 | A | * | 11/1994 | Chou | A63J 11/00 160/135 |
| 5,509,747 | A | * | 4/1996 | Kiendl | B64G 1/222 136/245 |
| 5,971,830 | A | * | 10/1999 | Tobin | A63D 3/00 273/241 |
| 6,152,434 | A | * | 11/2000 | Gluck | E04F 21/1805 254/114 |
| 6,675,538 | B2 | * | 1/2004 | Candio | A63J 11/00 273/110 |
| 7,810,771 | B1 | * | 10/2010 | Akers | E04G 21/24 160/368.1 |

* cited by examiner

*Primary Examiner* — Kien Nguyen
(74) *Attorney, Agent, or Firm* — Jeffrey Roddy

(57) ABSTRACT

A maze construction system for fire and rescue training exercises includes a plurality of panels that are tensionably supported between a ceiling and floor. Each panel includes at least one extendable column that terminates with a pad for contact with a ceiling surface. A flange along at least one vertical edge of the panels permits the panels to align at their edges. The panels are quickly assembled and disassembled, and are easily reconfigured to form new maze paths without requiring additional additional tools.

6 Claims, 10 Drawing Sheets

SYSTEM FOR CONSTRUCTING MAZES

CROSS REFERENCES TO RELATED APPLICATIONS

This application is a continuation-in-part of U.S. Utility application Ser. No. 14/325,399 having a filing date of Jul. 8, 2014, and titled "System for Constructing Mazes."

FIELD

The present invention relates generally to fire safety and more particularly, to training systems intended to simulate hazardous environments.

BACKGROUND

Fire training structures are special purpose installations that simulate various conditions faced by fire and rescue personnel. The specialized structures may include so called live-burn facilities, structures for ladder practice, rappelling, and maze installations whereby personnel are trained to navigate confined spaces or low visibility environments. Although it is a known practice to construct mazes for use in training, due to ad hoc construction that is not easily removed or altered from a fixed configuration, one resulting problem is that trainees are able to memorize the maze and thereby undermine the purpose of the training exercise; a primary goal of which is to foster responsive thinking and physical skills that enable personnel to quickly react to novel situations and impediments when encountered. Another issue stemming from ad hoc maze installations, is that limited resources compel some departments to use a single structure for multiple training exercises. A maze cobbled together from door panels or plywood sheets is difficult to take down, assemble and reconfigure thus wasting time and resources.

It would be desirable to provide a system for constructing mazes that is quickly assembled and disassembled without requiring tools.

It would be desirable to provide a system for constructing mazes that can be easily reconfigured without requiring tools.

It would be especially desirable if the system for constructing mazes were installable within spaces having varying floor to ceiling distances.

SUMMARY

In a preferred embodiment depicted herein, system for constructing mazes includes a plurality of panels, each panel having a sub-frame with sheathing thereover and wherein posts topped by pads are extendable from upper portions of the panel to stabilize the panel between a ceiling and floor. Vertical edges of the panels can be nestably aligned at 90 degrees, enabling a great variety of maze configurations. The posts are extendable by way of a jack screw or ratcheting element whereby the extendable posts with ceiling contacting pads are tensioned against the ceiling and locked in position. In the case of a ratcheted post, the extendable posts are ratcheted by an integrated lever and pawl. No additional tools are required to install and secure the panels vertically between the floor and ceiling of a structure. While in the various embodiments depicted herein, the ceiling contact pads are rectangular, other shapes and sizes may be employed without departing from the claimed invention. The ratcheting mechanism for extending the notched posts of the preferred embodiment shown herein can be any ratcheting mechanism that would be appreciated by those having skill in the art and benefit of this disclosure. Various mechanisms for ratcheting a post or column are known in the art. U.S. Pat. No. 1,175,211 to Willour, U.S. Pat. No. 1,459,194 to Burkholder and U.S. Pat. No. 2,501,603 to Howard disclose various ratcheting jacks that utilize a lever and pawl arrangement whereby a notched post or column is moved linearly through a saddle, and are incorporated by reference herein in their entirety. In various embodiments herein, the panels include floor pads which are adjusted by rotating the pads as required to level the panel on uneven surfaces. Panel sides include a flange strip for aligning additional panels and quick reconfiguration of the panels. The flange strips include a lip that extends from opposite; i.e., diagonally disposed edges of the panel faces. While the panels do not typically lock or otherwise couple with one another along their edges, a latch (not shown) at the nexus of one or more panels may be provided. The flange strips provide a substantially gap free connection between adjacent panel edges.

In a first general aspect of the present invention, to construct a maze, a plurality of panels are tensionably supported in a vertical position between a ceiling and floor by means of tensionable posts.

In a second aspect combinable with any other aspect, post extension means for reversibly extending and tensioning the posts against a surface of a ceiling includes a ratcheting handle or jack screw mechanism.

In a third aspect combinable with any other aspect, a single extendable post is located medially along a top portion of a panel.

In a fourth aspect combinable with any other aspect, ratcheting or jack screw means to extend the posts are accessible along vertical sides of the panels.

In the foregoing aspects, a flange strip along vertical edges of each panel permits the installation of at least 3 additional panels at the nexus of multiple adjacent flanges.

It will be appreciated by those of ordinary skill in the art that the overall size of the apparatus of the present invention can vary. While the sub-frame is preferably channel steel, it can be of any sufficiently rigid material to withstand tensioning against the floor and ceiling. While the outer sheathing is preferably sheet steel, other materials which are more resilient than steel, or those having particularly desirable heat resistant properties may be employed without departing from the claimed invention.

The foregoing and other objects, features, and advantages of the invention will become more apparent from the following detailed description, which proceeds with reference to the accompanying figures wherein the scale depicted is approximate.

DETAILED DESCRIPTION OF THE INVENTION

Reference Listing:
100 panel
210 sub-frame/side rail
211 perimeter frame
212 top edge
213 bottom edge
214 vertical edge
216 guide
218 column
220 notches
222 ratcheting member with lever
224 ceiling pad
226 foot pad
228 sheathing
230 flange strip
240 jack screw
250 lock collar
CM Cross Member
300 hand truck
Definitions Unless otherwise explained, any technical terms used herein have the same meaning as commonly understood by one of ordinary skill in the art to which this disclosure belongs. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references mentioned herein, if any, are incorporated by reference in their entirety for all purposes. In case of conflict, the present specification, including explanations of terms, will control. In addition, the materials, methods, and examples are illustrative only and not intended to be limiting.

Referring generally to FIGS. 1-17, in a preferred embodiment, a system for constructing mazes includes a plurality of panels 100. Each panel includes a sub-frame 210, a pair of vertically extendable posts or tubes 218 terminating with a pads 224 for tensionable contact with a ceiling and a pair of foot pads 226 for contact with a floor. The vertically extendable posts are tensioned against the ceiling by a handle 222 pivoting within a fixed saddle that surrounds a notched 220 post in the manner of a ratcheting jack. While in the preferred embodiment shown herein, the posts are cylindrical and move vertically within tubular guides 216, polygonal channel of any rigid material may be employed for the posts without departing from the claimed invention.

Figures 1, 2:
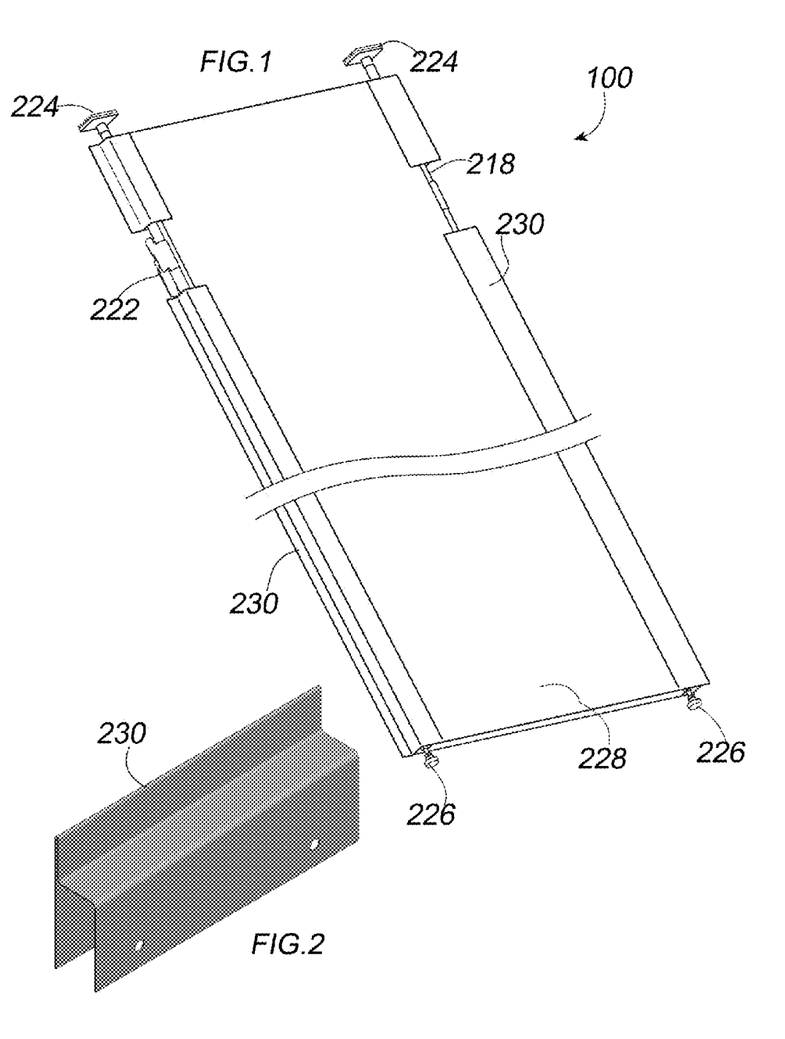
FIG. 1 is a isometric view of a panel of a preferred embodiment according to the present invention showing panel (100) with ceiling pads (224) and foot pads (226)
FIG. 2 is a enlarged view of a section of flange strip (230)

FIG. 1 is a isometric view of a sheathed panel. Preferably, flanges strips 230 are formed with the profile shown in (FIG. 2). In one preferred embodiment herein, each flange strip is generally co-planar with opposite sides of the panel.

Figure 3:
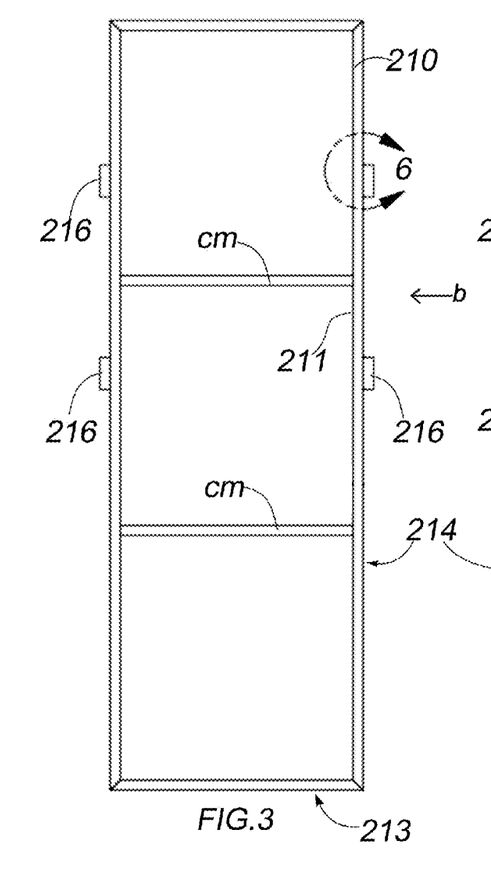
FIG. 3 is a front plan view of a sub-frame (210) with column guides (216)
Figure 4:
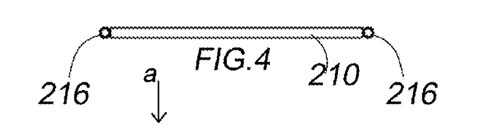
FIG. 4 is an edge view taken in the direction of arrow (a) of (FIG. 3)
Figures 5, 6:
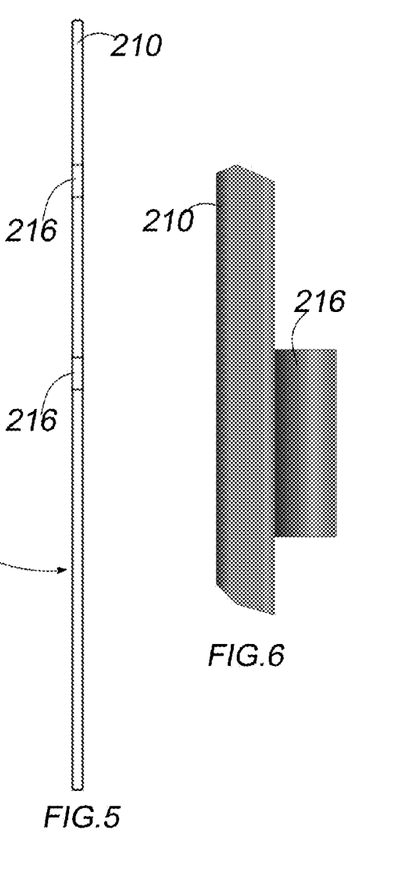
FIG. 5 is an edge view taken in the direction of arrow (b) of (FIG. 3)
FIG. 6 is an enlarged detail view of the section circumscribed by call-out (6) in (FIG. 3)

FIG. 3 is a front plan view of a panel sub-frame wherein post guides 216 are attached, typically by welding, along the vertical sides. The post guides are tubular sections that maintain alignment of extendable posts 218. FIGS. 4 and 5 are respectively, top edge and vertical edge views of the sub-frame of (FIG. 3). FIG. 6 is an enlarged detail view of call-out (6) of (FIG. 3), and shows a tubular guide mounted to sub-frame 210.

Figures 7, 8:
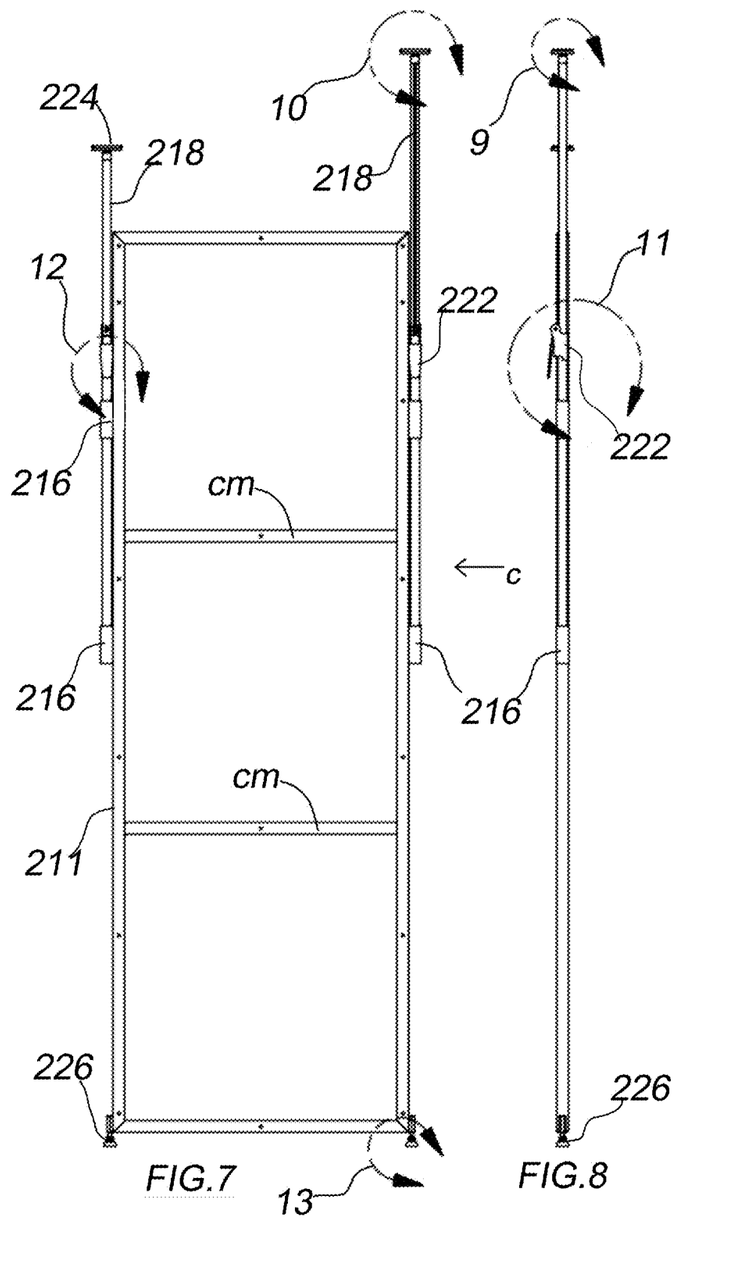
FIG. 7 is a front plan view of a panel sub-frame (210) with extended columns (218) and ceiling pads (224)
FIG. 8 is an edge view taken in the direction of arrow (c) of (FIG. 7)
Figures 9, 10, 11:
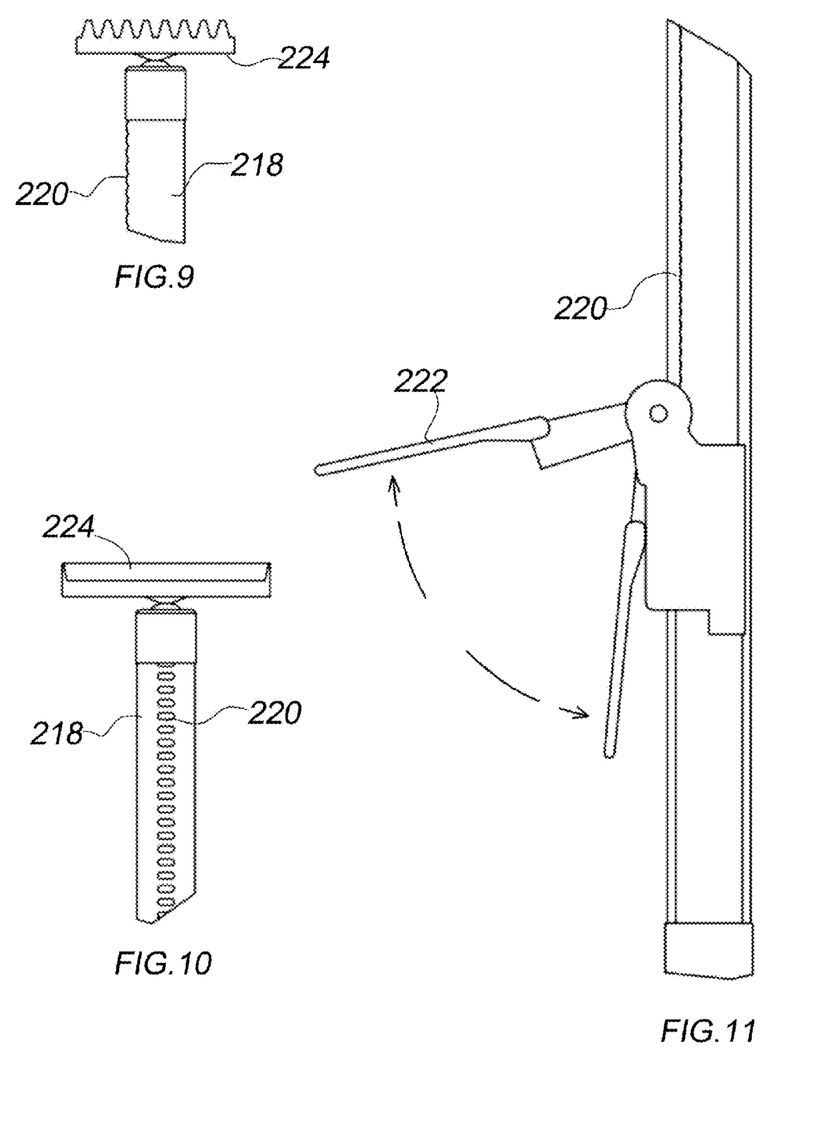
FIG. 9 is an enlarged detail view of the section circumscribed by call-out (9) in (FIG. 8)
FIG. 10 is an enlarged detail view of the section circumscribed by call-out (10) in (FIG. 7)
FIG. 11 is an enlarged detail view of the section circumscribed by call-out (11) in (FIG. 8)
Figure 12:
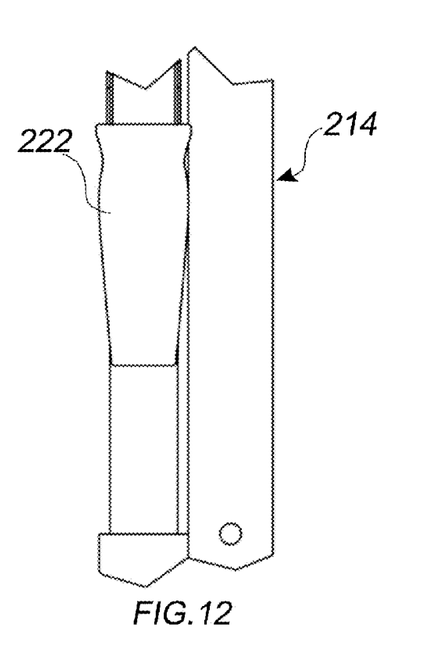
FIG. 12 is an enlarged detail view of the section circumscribed by call-out (12) in (FIG. 7)
Figure 13:
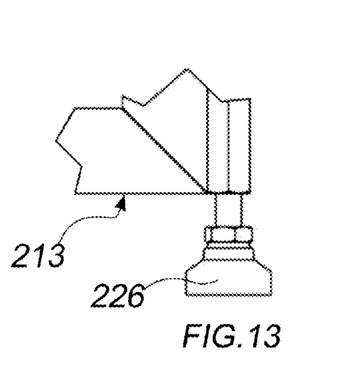
FIG. 13 is an enlarged detail view of the section circumscribed by call-out (13) in (FIG. 7)

Moving to FIGS. 7 and 8, a pair of extendable posts 218 with ceiling pads 224, a pair of corresponding pivoting handles 222 for ratcheting the posts and foot pads 226 are added to the sub-frame. FIG. 9 is a side detail view of a ceiling pad. Preferably, the corrugated surface of the pads is elastomeric to resist lateral movement when pressed against a ceiling. FIG. 10 is a front detail view of a section of extendable post with notches 220 to receive a pawl and catch. FIG. 11 is an enlarged side view of a handle/lever and saddle 222 for vertically ratcheting the extendable post. Note that sheathing 228 is absent over the handles which are recessed slightly away from the panel face and edges. FIG. 12 is a front detail view of a handle. FIG. 13 is a detail view of a corner foot pad 226. While the embodiment shown depicts a ladder type sub-frame (FIGS. 3 and 7), other sub-frame configurations may be employed without departing from the claimed invention.

Figure 14:
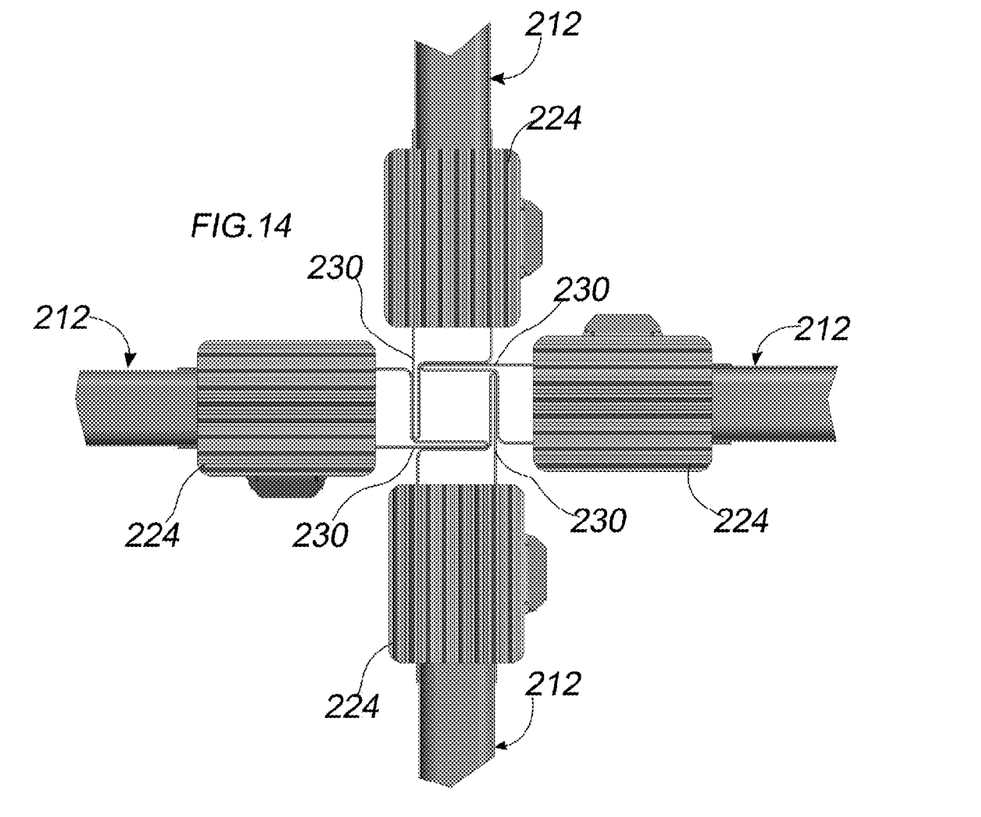
FIG. 14 is a partial view that depicts top edge (212) of panels when four are aligned along flange strips (230)

FIG. 14 is a top down view of a group of 4 panels positioned at 90 degree angles.

Figure 15:
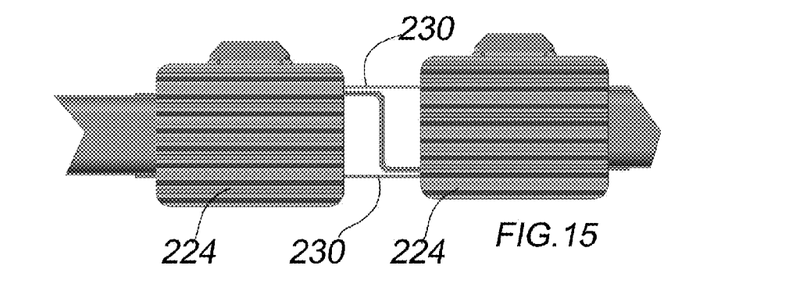
FIG. 15 is a partial view that depicts top edge (212) of panels when two are aligned along flange strips (230).

FIG. 15 is a top down view of a pair of panels abutting along flange strips 230.

Figures 16, 17:
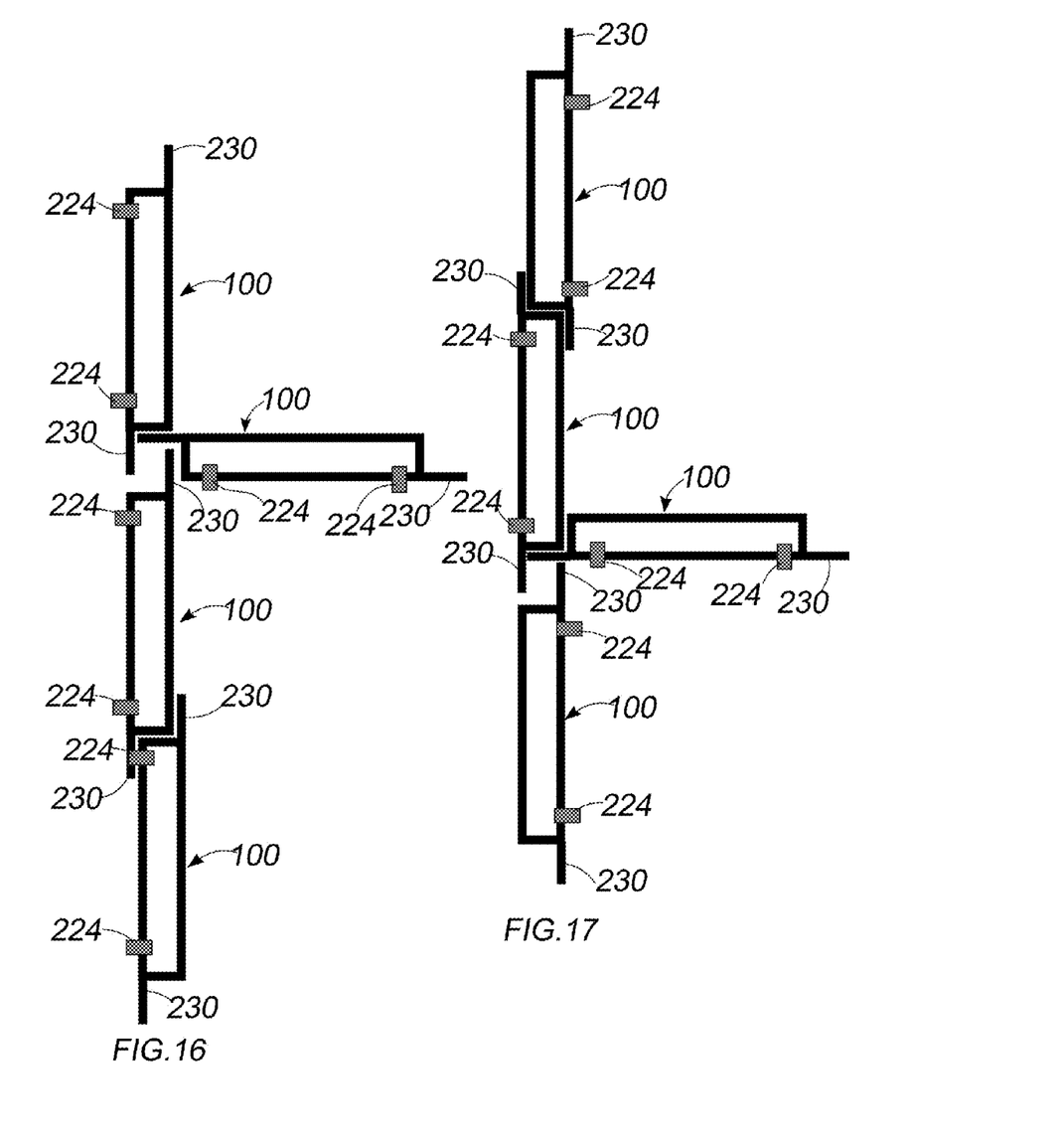
FIGS. 16 and 17 depict respectively, various panel alignment and overlapping schemes.

FIGS. 16 and 17 depict possible panel arrangements. In FIG. 16, the flange strips are reversed so that each projecting flange is generally co-planar with opposite faces of a panel, whereas, in FIG. 17, both flange strips are generally co-planar with a single face of the panel.

Figure 18:
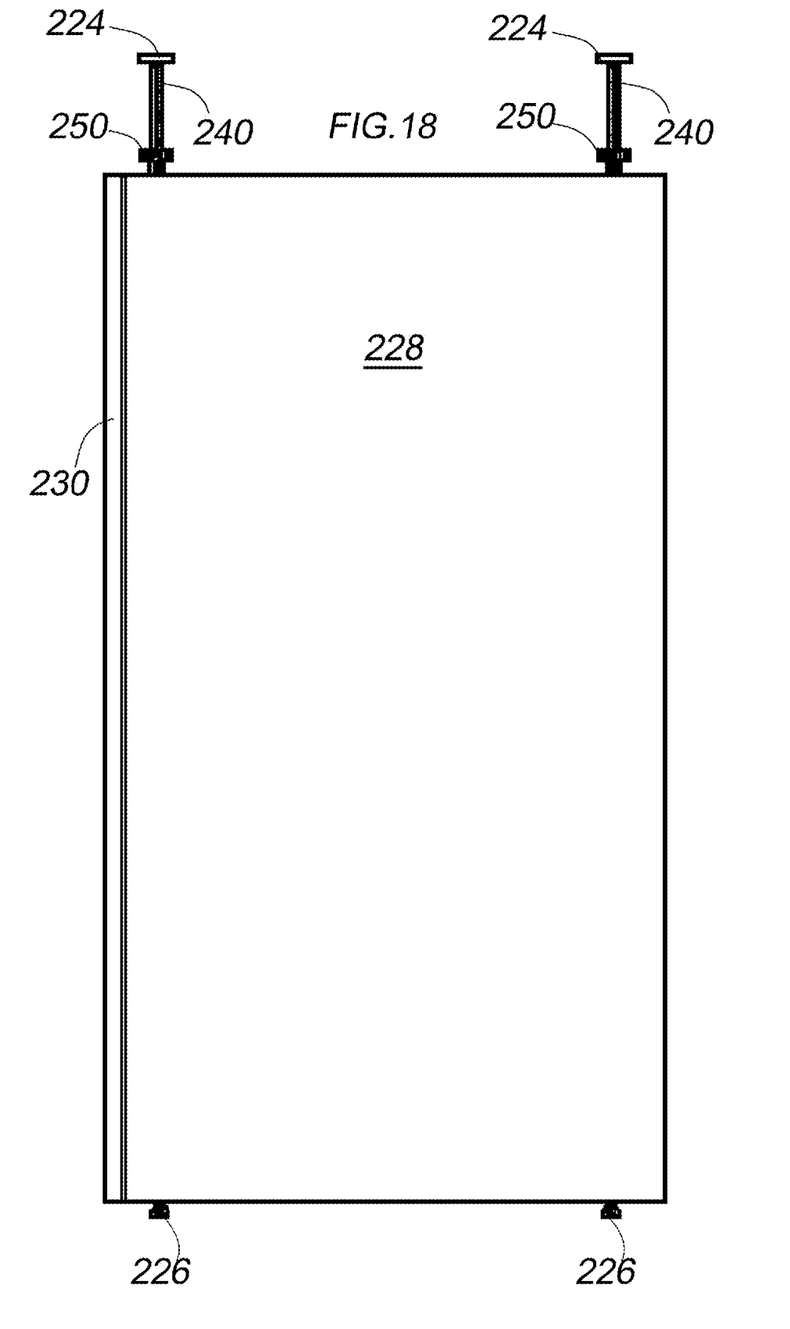
FIG. 18 is a front plan view of an another embodiment according to the present invention that includes jack screws.

FIG. 18 depicts an embodiment that employs a pair of jack screws 240; one each at the upper corners of the panel. The jack screws have a ceiling pad at one end, and are held in place by a fixed threaded channel (not shown) within the panel, which is typically welded to the side rails. The extendable length of the jack screws can vary, but is sufficient to brace the panel against a ceiling when extended. A threaded collar/nut 250 is used to lock the jack screws when at the desired length.

Figure 19:
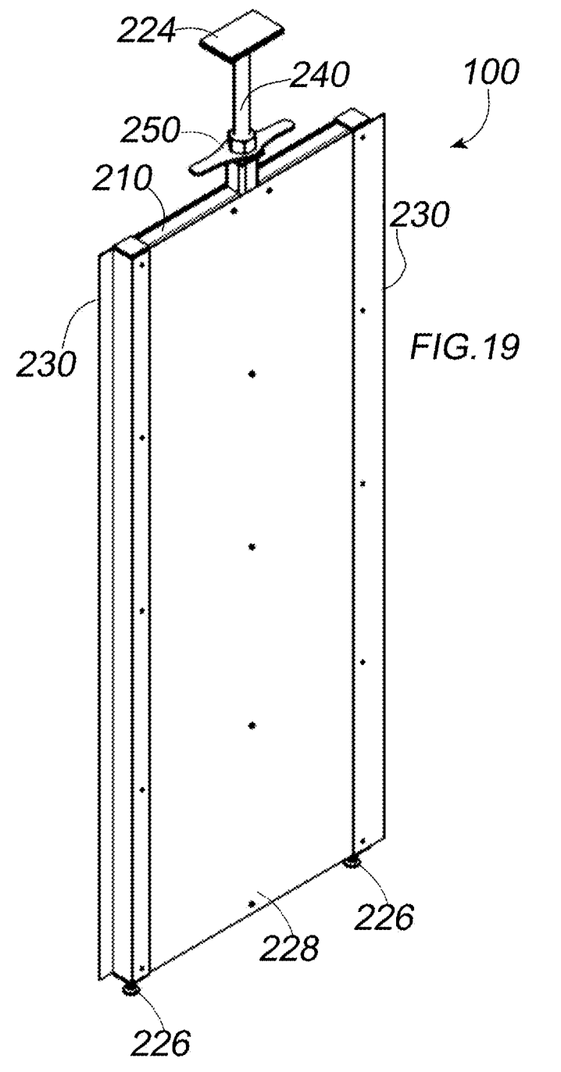
FIG. 19 is an isometric view of an embodiment that includes a medially located and extendable post.
Figure 20:
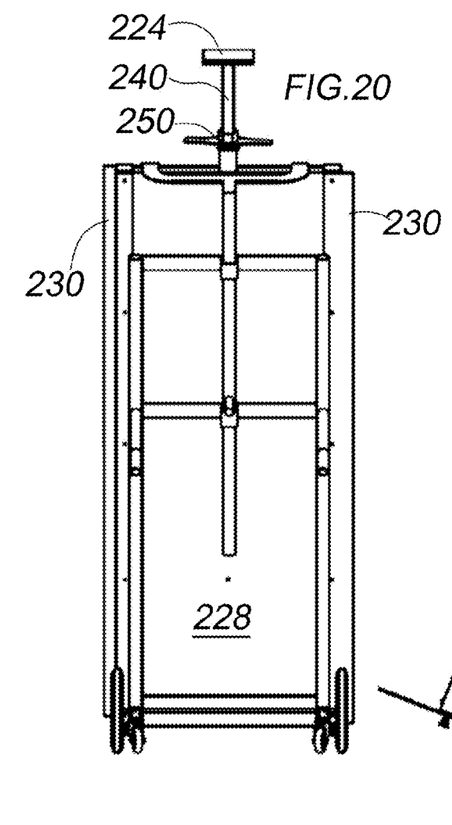
FIGS. 20 and 21 are respectively, front and side elevation views showing a hand truck configured to transport multiple panels and position panels within a maze framework.
Figure 21:
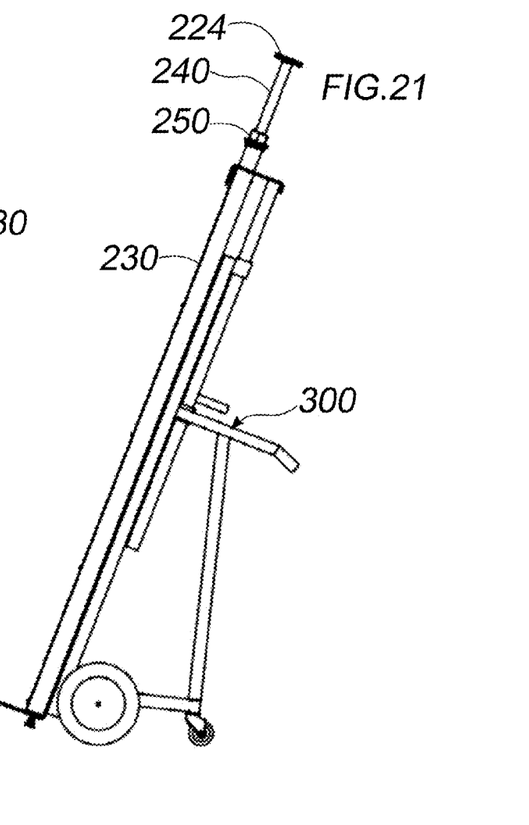

FIGS. 19-21 illustrate an alternate embodiment that instead of a pair of vertically extendable posts, employs a single extendable post 241 medially positioned along the top of panel. In this case, the extendable post may be topped with a swivelable ceiling pad 225 that permits a single pad to be tensioned against an uneven surface which in some cases provides for a quicker installation. Likewise, the foot pads 227 may possess a ball joint or be otherwise swivelable in order to maintain tension against an uneven floor surface. With the single extendable post an installer need only tension one post to obtain sufficient purchase between the ceiling and floor. Excepting the single extendable post, the alternate embodiment substantially shares the described structural features of the embodiment depicted in FIGS. 1-17. For example, while the particular embodiment shown in FIG. 19 employs a jack screw to extend the post, objects, aspects and features of any previously described embodiment may be combined with objects, aspects and features of any other embodiment described herein. Accordingly, the mechanism for extending the single extendable post may include a jack screw or a ratcheting member in the manner disclosed.

It should be noted that the hand truck 300 shown in FIGS. 20-21 which is configured to retain and transport single or multiple panels may be used with any of the embodiments described herein to transport single or multiple panels to and from a desired location when installing a maze or for uninstalling the maze.

It should be understood that the drawings and detailed description herein are to be regarded in an illustrative rather than a restrictive manner, and are not intended to be limiting to the particular forms and examples disclosed. The configuration of a handle, or grip of the panel can be of any design and can be for one or two-handed operation. The panel can be of any length or width, hollow, or filled with insulation or other material. The sheathing may be attached to the sub-frame by any means including spot welding, fasteners, adhesives or magnetically as will be appreciated by those having skill in the art. Although the present invention is directed to fire safety applications, other applications, for example, police and military training environments and other installations will suggest themselves to those having skill in the art. Accordingly, it is intended that this disclosure encompass any further modifications, changes, rearrangements, substitutions, alternatives, design choices, and embodiments as would be appreciated by those of ordinary skill in the art having benefit of this disclosure, and falling within the spirit and scope of the following claims.

What is claimed is:

1. A maze system comprising:
   (1) a plurality of nestable panels, wherein each panel has a first face and a second face opposite the first face, and, a sub-frame between the first and second faces that includes: a top edge, a bottom edge, a first vertical side and second vertical side, each first and second vertical side having a flanged portion and an un-flanged portion wherein the flanged portions project beyond the first side and second vertical sides and are diagonally disposed on opposite faces of the panel and wherein the flanged portions are configured to overlap un-flanged portions of adjacently nested panels with readily separable and substantially gapless connections between adjacent panels;
   (2) medially located at the top edge of each panel, a reversibly extendable post with jack screw extension means and an end that includes a pivotable ceiling contacting pad whereby each panel is maintained in position by tensioning the panels against the ceiling of a structure.

2. The maze system according to claim 1 wherein at least 4 panels can be nestably aligned along the flanges.

3. The maze system according to claim 1 further comprising at least one floor contacting pad.

4. A maze system comprising:
   (1) a plurality of nestable panels, wherein each panel has a first face and a second face opposite the first face, and, a sub-frame between the first and second faces that includes: a top edge, a bottom edge, a first vertical side and second vertical side, each first and second vertical side having a flanged portion and an un-flanged portion wherein the flanged portions project beyond the first side and second vertical sides and are diagonally disposed on opposite faces of the panel and wherein the flanged portions are configured to overlap un-flanged portions of adjacently nested panels with readily separable and substantially gapless connections between adjacent panels;
   (2) medially located at the top edge of each panel, a reversibly extendable post with ratcheting extension means and an end that includes a pivotable ceiling contacting pad whereby each panel is maintained in position by tensioning the panels against the ceiling of a structure.

5. The maze system according to claim 4 wherein at least 4 panels can be nestably aligned along the flanges.

6. The maze system according to claim 4 further comprising at least one floor contacting pad.

* * * * *